United States Patent
Pyshos et al.

(10) Patent No.: US 10,190,736 B1
(45) Date of Patent: Jan. 29, 2019

(54) APPARATUS FOR PROVIDING OFF-AXIS ILLUMINATION

(71) Applicants: Steven Walter Pyshos, Peachtree City, GA (US); Ren Chao, Dongguan (CN); Smita Sudheer Anaokar, Smyrna, GA (US)

(72) Inventors: Steven Walter Pyshos, Peachtree City, GA (US); Ren Chao, Dongguan (CN); Smita Sudheer Anaokar, Smyrna, GA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 38 days.

(21) Appl. No.: 15/136,756

(22) Filed: Apr. 22, 2016

(51) Int. Cl.
| | |
|---|---|
| *F21S 8/02* | (2006.01) |
| *F21V 7/00* | (2006.01) |
| *F21V 5/00* | (2018.01) |
| *F21V 29/77* | (2015.01) |
| *F21V 13/04* | (2006.01) |
| *F21V 5/02* | (2006.01) |
| *F21Y 101/02* | (2006.01) |

(52) U.S. Cl.
CPC ............... *F21S 8/026* (2013.01); *F21V 5/00* (2013.01); *F21V 5/02* (2013.01); *F21V 7/0091* (2013.01); *F21V 13/04* (2013.01); *F21V 29/777* (2015.01); *F21Y 2101/02* (2013.01)

(58) Field of Classification Search
CPC ............ B64D 11/00; B64D 2011/0038; B64D 2203/00; B64D 2211/0053; B64D 2211/0038; F21S 8/026; F21S 8/086; F21V 1/00; F21V 21/04; F21V 5/008; F21V 5/046; F21V 5/08; F21V 7/0091; F21V 7/04; F21V 5/00; F21V 13/04; F21Y 2103/10; F21Y 2105/10; F21Y 2115/10; G02B 17/086; G02B 17/00; G02B 19/0028; G02B 17/0864
See application file for complete search history.

(56) References Cited

U.S. PATENT DOCUMENTS

| | | | |
|---|---|---|---|
| 6,082,878 A | 7/2000 | Doubeck et al. | |
| 7,411,742 B1* | 8/2008 | Kim | F21V 5/04 257/E33.072 |
| 7,866,837 B2* | 1/2011 | Ho | F21V 5/04 362/19 |
| 8,058,665 B2* | 11/2011 | Wang | F21V 5/008 257/98 |
| 8,132,944 B2* | 3/2012 | Ruud | F21S 8/02 362/147 |
| 8,231,248 B2* | 7/2012 | Fu | F21V 5/04 362/308 |

(Continued)

*Primary Examiner* — Hargobind S Sawhney
(74) *Attorney, Agent, or Firm* — King & Spalding LLP (57) ABSTRACT

A light emitting diode can emit light along an axis. An optic can be positioned to direct the emitted light off of the axis. The optic can comprise a base and a projection that rises from the base towards the light emitting diode. The projection can comprise a cavity that is oriented to receive the light emitted by the light emitting diode. The cavity can be slanted relative to the axis of the light emitting diode. A convex surface disposed at the bottom of the cavity can condense, focus, or collimate light. The projection can further comprise sides that totally internally reflect light.

20 Claims, 8 Drawing Sheets

(56) References Cited

U.S. PATENT DOCUMENTS

| | | | | |
|---|---|---|---|---|
| 8,267,553 | B2 * | 9/2012 | Liang | F21V 13/04 |
| | | | | 362/308 |
| 9,541,258 | B2 * | 1/2017 | Castillo | F21V 5/04 |
| 2008/0198620 | A1 * | 8/2008 | Bihr | G02B 6/0006 |
| | | | | 362/603 |
| 2010/0014286 | A1 * | 1/2010 | Yoneda | F21V 5/00 |
| | | | | 362/231 |
| 2010/0110695 | A1 * | 5/2010 | Nakamura | F21V 5/04 |
| | | | | 362/311.09 |
| 2011/0096553 | A1 * | 4/2011 | Shimokawa | F21V 5/04 |
| | | | | 362/311.02 |
| 2012/0039077 | A1 * | 2/2012 | Householder | G02B 17/086 |
| | | | | 362/308 |
| 2012/0300469 | A1 * | 11/2012 | Jorgensen | F21V 5/008 |
| | | | | 362/327 |
| 2013/0051030 | A1 * | 2/2013 | Lee | F21V 5/04 |
| | | | | 362/311.02 |
| 2013/0058103 | A1 * | 3/2013 | Jiang | F21V 5/04 |
| | | | | 362/296.05 |
| 2013/0308319 | A1 * | 11/2013 | Zhang | F21S 8/02 |
| | | | | 362/311.01 |
| 2014/0307453 | A1 * | 10/2014 | Ohta | B64D 11/00 |
| | | | | 362/471 |
| 2015/0354780 | A1 * | 12/2015 | Wang | G02B 3/08 |
| | | | | 362/294 |
| 2015/0369450 | A1 * | 12/2015 | Johnson | G02B 3/08 |
| | | | | 362/294 |

* cited by examiner

APPARATUS FOR PROVIDING OFF-AXIS ILLUMINATION

TECHNICAL FIELD

Embodiments of the technology relate generally to illumination systems and more particularly to an optic that receives light from a light emitting diode and redirects the light off axis.

BACKGROUND

As compared to incandescent and fluorescent light sources, light emitting diodes (LEDs) offer substantial potential benefit associated with their energy efficiency, light quality, and compact size. However, to realize the full potential benefits offered by light emitting diodes, new technologies are needed.

For instance, there are needs in the art for technology to utilize light emitting diodes for illumination. Need exists for optics and light-emitting-diode-based systems that can direct light laterally. Need exists for an optic or an optical system that can receive light from a light source that has an axis and steer the received light off of the axis. Further need exists for an improved wall wash lighting system. A capability addressing one or more such needs, or some other related deficiency in the art, would support improved illumination and more widespread utilization of light emitting diodes in lighting applications.

SUMMARY

In one aspect of the disclosure, an optic can receive light from a light source and can steer or direct the light off-axis relative to an axis of the light source. The light source can comprise one or more light emitting diodes for producing the light, for example. The optic can comprise a base and a projection that projects from the base towards the light source. The projection can comprise a cavity that is oriented to receive the light emitted by the light emitting diode. The cavity can be slanted relative to the axis of the light source. A portion of the emitted light can propagate in the cavity to a convex surface at the bottom of the cavity that can condenses, focuses, or collimates incident light. The resulting beam or pattern of light can transmit through the base of the optic at an acute angle relative to the axis of the light source. Another portion of the emitted light can transmit through the side of the cavity and be incident upon a total internally reflective surface that circumscribes or extends circumferentially about the cavity. The resulting beam or pattern of light can transmit through the base of the optic at an acute angle relative to the axis of the light source.

In another aspect of the disclosure, the optic can be utilized with a second optic for further directing the light off of the axis of the light source. The second optic can comprise a pattern of features that steer light via refraction. The features can comprise parallel grooves in some examples. The parallel grooves can comprise Fresnel prisms, for example.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE FIGURES

Reference will be made below to the accompanying drawings.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

A system of one or more optics can process light emitted by one or more light emitting diodes to create a desirable pattern of illumination. The illumination pattern may be asymmetric with respect to an axis of the light emitting diode and may diverge from that axis. The illumination pattern may further be skewed, biased, or offset relative to a mechanical axis of a luminaire that incorporates the light emitting diode and the optical system. When recess mounted into a ceiling in a flush configuration, the resulting pattern of illumination can present a desirably uniform illumination pattern on an adjacent wall.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Figure 1A:
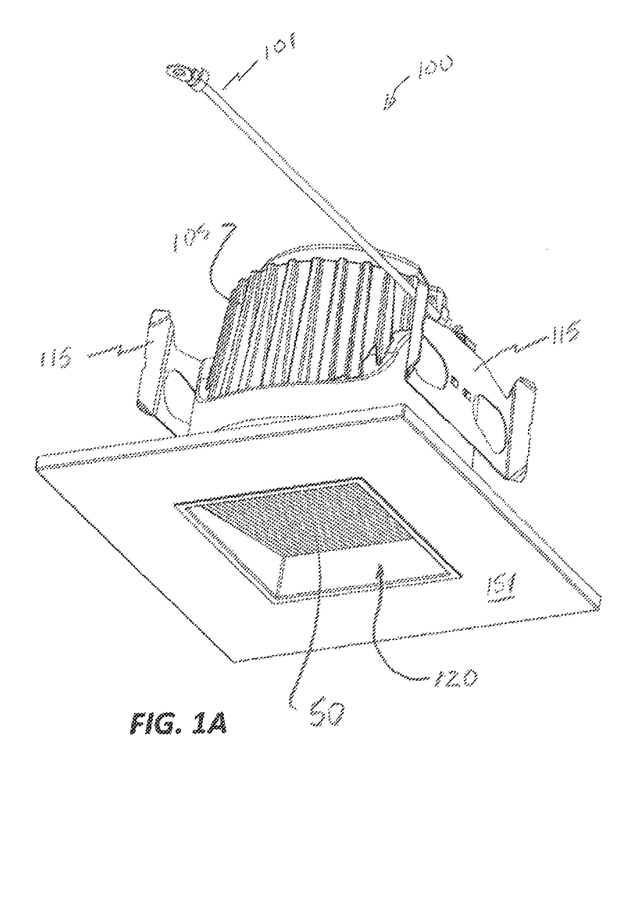
FIGS. 1A, 1B, 1C, and 1D (collectively FIG. 1) are illustrations of an example luminaire in accordance with some embodiments of the disclosure.
Figure 1B:
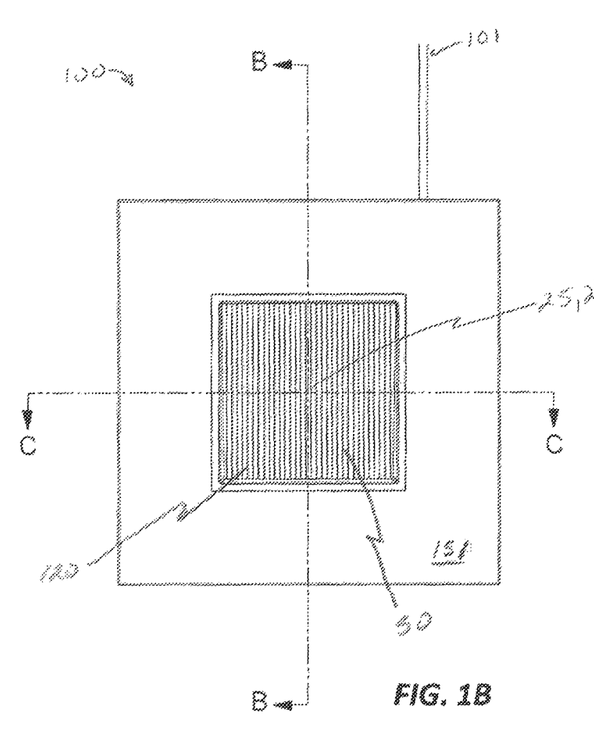
Figure 1C:
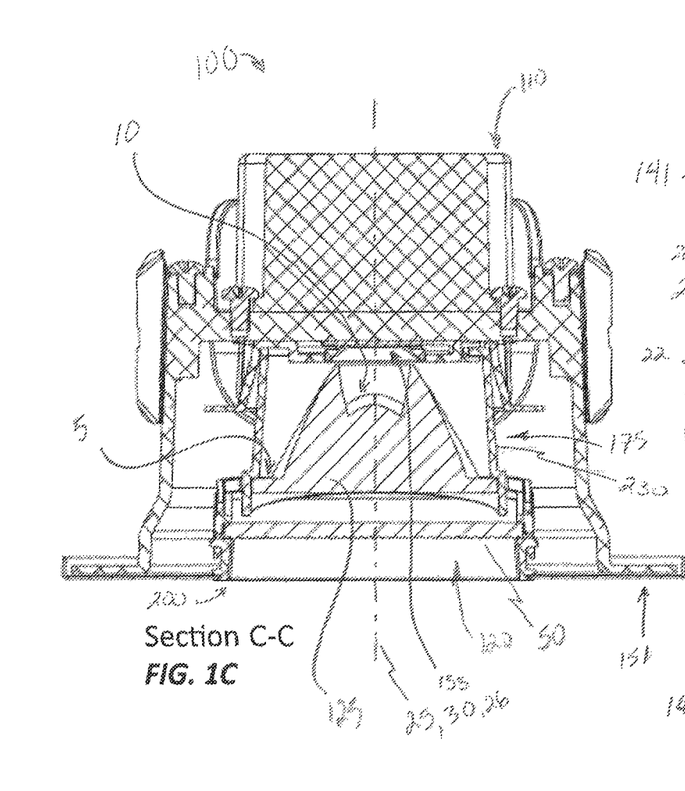
Figure 1D:
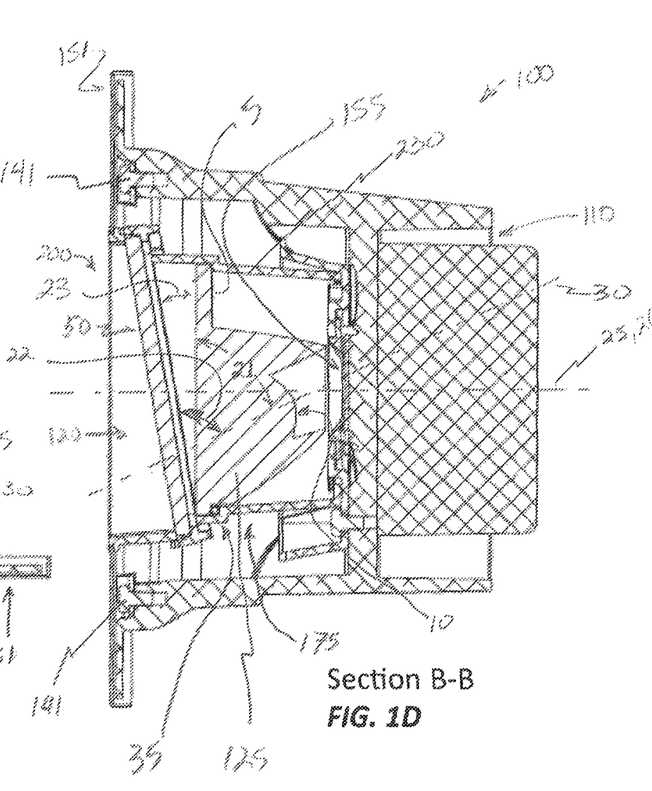

FIGS. 1A, 1B, 1C, and 1D illustrate a luminaire 100 according to some example embodiments of the disclosure. FIG. 1A illustrates a perspective view of the luminaire 100 taken from below. FIG. 1B illustrates a straight-on view of the luminaire 100 taken from below the luminaire 100, on the light-emitting side of the luminaire 100. FIG. 1C illustrates a cross sectional view of the luminaire 100 taken at the C-C section indicated in FIG. 1B. FIG. 1D illustrates a cross sectional view of the luminaire 100 taken at the B-B section indicated in FIG. 1B. The view of FIG. 1D is perpendicular to the cross sectional view of FIG. 1C.

The example luminaire 100 illustrated in FIG. 1 can comprise a recessed lighting fixture or recessed luminaire that may be mounted in a ceiling, for example adjacent a wall. In such an installation, the luminaire 100 can emit illumination that propagates downward while casting light on the wall, for example in a wall-wash configuration.

To accommodate recessed lighting applications, the illustrated luminaire 100 is outfitted with rectangular trim 151. The trim 151 facilitates mounting at a flat surface, for example in a ceiling or other appropriate structure. When deployed in a recessed ceiling application, the trim 151 extends around a hole in the ceiling in which the luminaire 100 is mounted. Brackets 115 facilitate mounting the luminaire 100 to beams or other structures or supports above the ceiling. In the illustrated example configuration, a grounding wire 101 extends from above one of the brackets 115 for convenient grounding during installation.

In the illustrated embodiment, the frame of the luminaire 100 comprises magnets 141 that are located around a light-emitting aperture 120 of the luminaire 100. The magnets 141 may be held in place using glue, crimping, screws, press fit, or other appropriate attachment facilities, for example.

The trim 151 is typically formed of a material that is magnetically active, for example steel or iron, so that the magnets 141 attract and retain the trim 151. While as illustrated, the magnets 141 are attached to the body of the luminaire 100, in some other embodiments, the magnets 141 are integrated in the trim 151. In such an embodiment, the trim 151 may be composed of a plastic, aluminum, or other non-magnetic material.

As illustrated in FIG. 1A, the upper portion of the luminaire 100 comprises heat sink fins 105 for dissipating heat generated during operation of a light emitting diode 155. The luminaire frame encloses an electrical supply and provides thermal management for operating the light emitting diode 155, in the form of heat dissipation via the heat sink fins 105. The example luminaire 100 further comprises a pocket or opening 110, opposite the heat sink fins 105, for wiring connections.

The illustrated luminaire 100 comprises a light module 175 that is located in the aperture 120 of the luminaire 100 and that emits light out of the luminaire 100 through a central opening in the trim 151. As illustrated, the light module 175 comprises a housing 230 in which a primary optic 125 and a secondary optic 50 are mounted. As will be further discussed below, the primary optic 125 and the secondary optic 50 control light emitted by the light emitting diode 155, with the two optics 125, 50 and the light emitting diode 155 forming an optical system 200.

Figure 2:
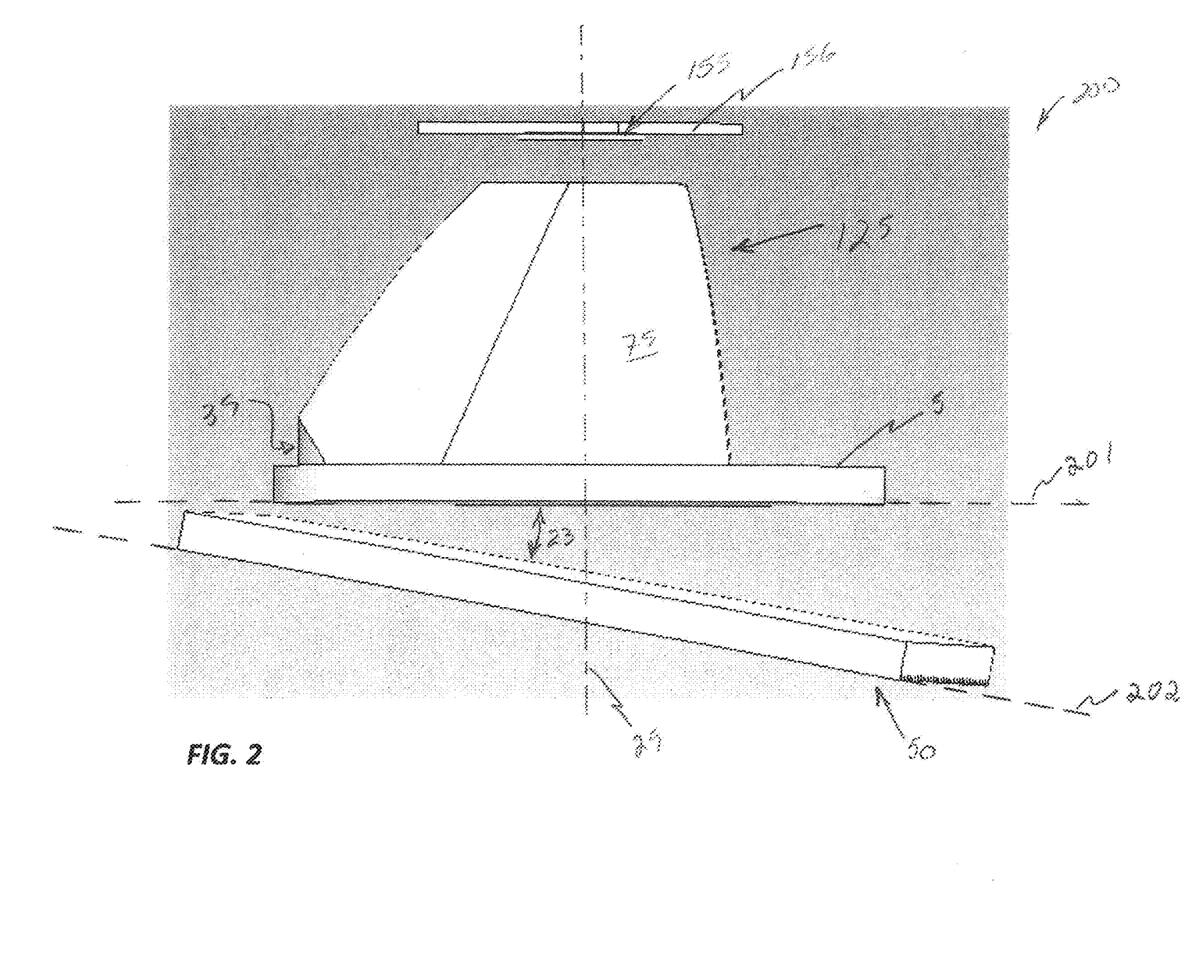
FIG. 2 is an illustration of an example optical system for the luminaire illustrated in FIG. 1 in accordance with some embodiments of the disclosure.

In the embodiment of FIG. 1, the light module 175 is positioned adjacent the light emitting diode 155, which is typically permanently mounted to the frame of the luminaire 100 at a bottom of the aperture 120. (However, in some embodiments, the light emitting diode 155 is permanently mounted to the light module 175.) That is, the light emitting diode 155 is typically mounted to the frame of the luminaire 100, and the light module 175 can be taken in and out of the luminaire 100 as a unit in the field. In some other embodiments, the light emitting diode 155 is an integral part of the light module 175 that can be field removed or installed. The light emitting diode 155 can have an associated circuit board 156 as illustrated in FIG. 2, for example.

The illustrated light emitting diode 155 can comprise a single light emitting diode, for example a chip-on-board light emitting diode or a cluster or array of light emitting diodes. The light emitting diode 155 has an optical axis 25 that is generally aligned with and may be coincident with the mechanical axis 26 of the luminaire 100. The luminaire's mechanical axis 26 can comprise an axis for the aperture 120, for example. In operation, the light emitting diode 155 emits light that may be centered on and may travel along the optical axis 25.

Figure 3A:
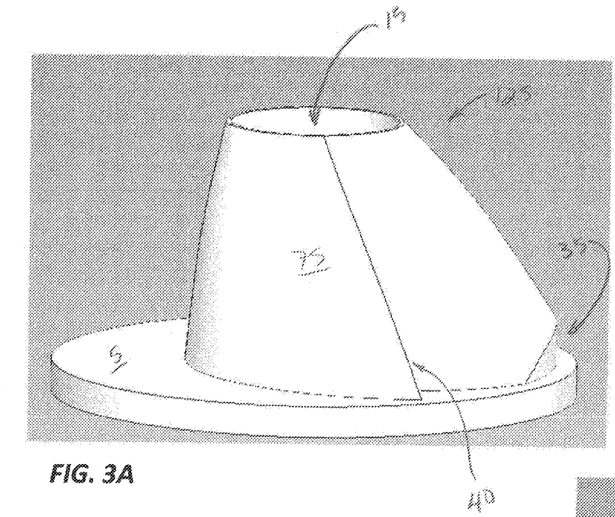
FIGS. 3A, 3B, 3C, 3D, 3E, 3F, and 3G (collectively FIG. 3) are illustrations of an example optic for the optical system illustrated in FIG. 2 (and for the luminaire illustrated in FIG. 1) in accordance with some embodiments of the disclosure.
Figure 3B:
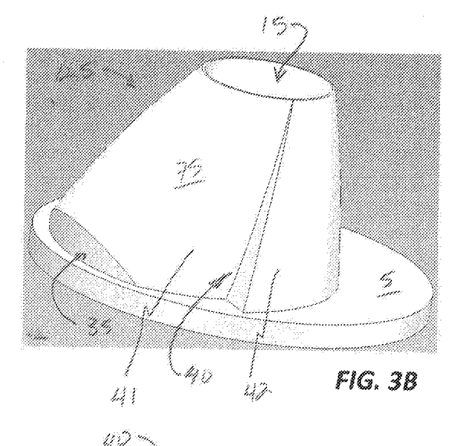
Figure 3C:
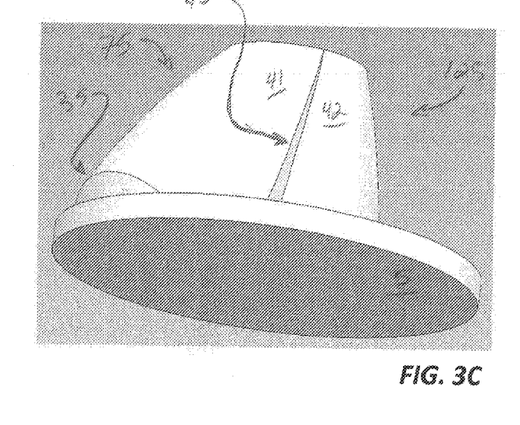
Figure 3D:
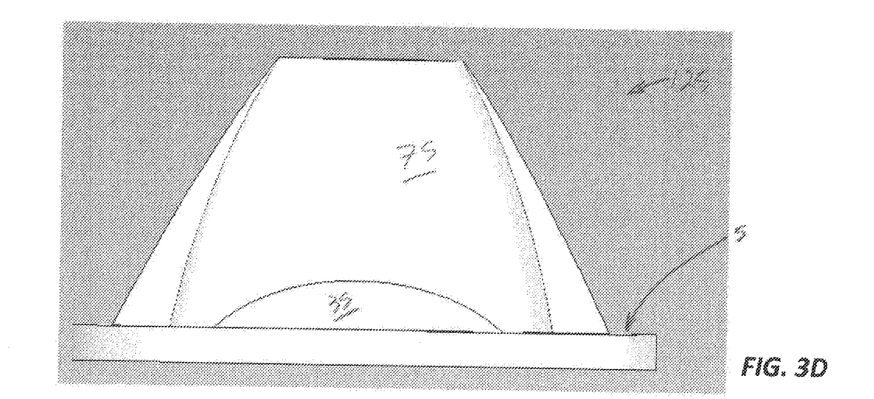
Figure 3E:
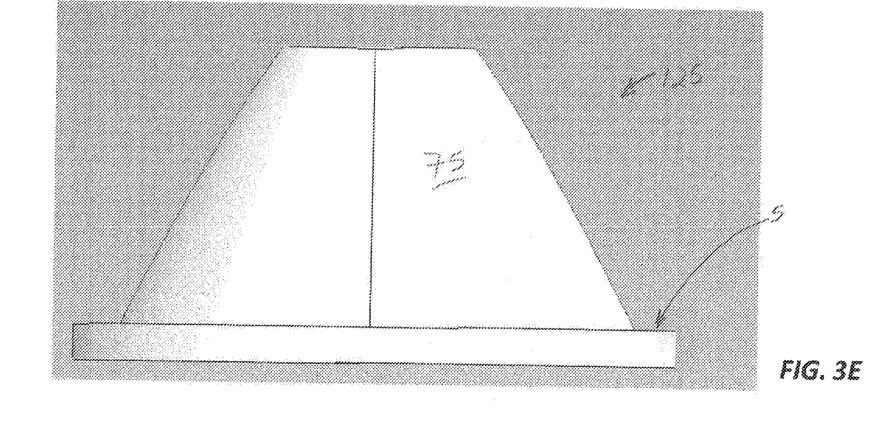
Figure 3F:
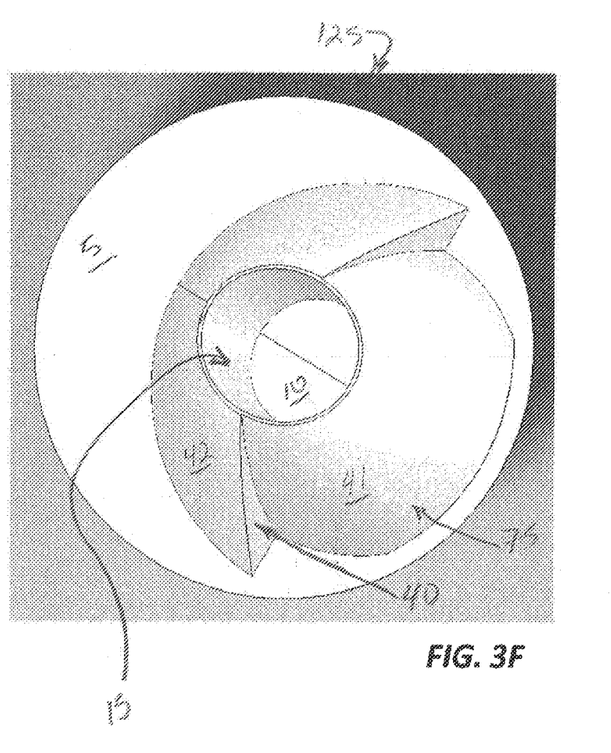
Figure 3G:
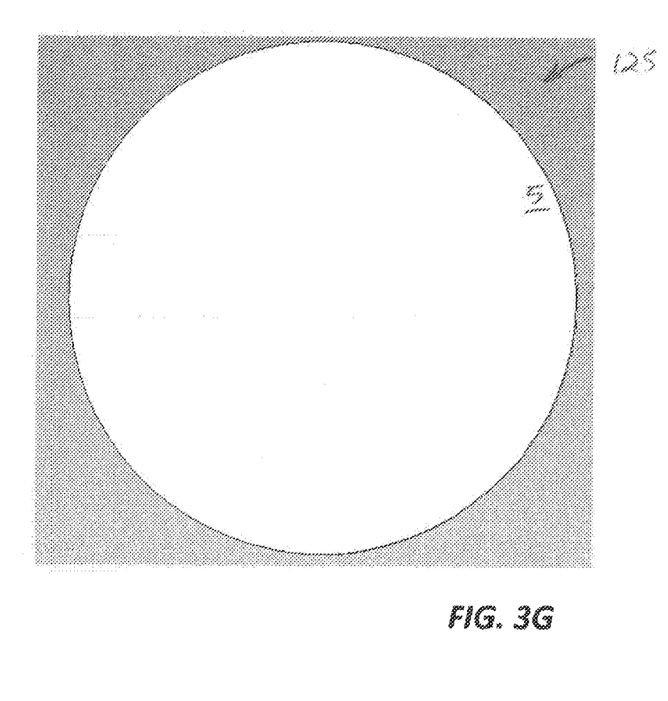
Figure 4A:
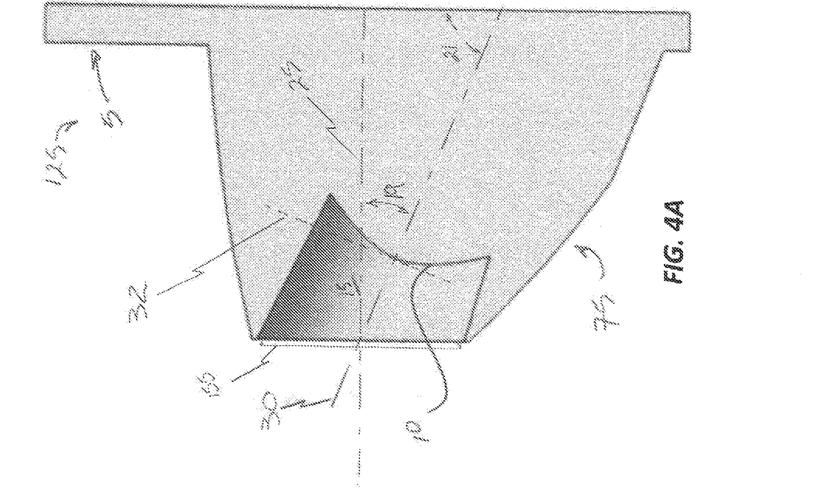
FIGS. 4A and 4B (collectively FIG. 4) are cross sectional illustrations of the example optic illustrated in FIG. 3 in accordance with some embodiments of the disclosure.
Figure 4B:
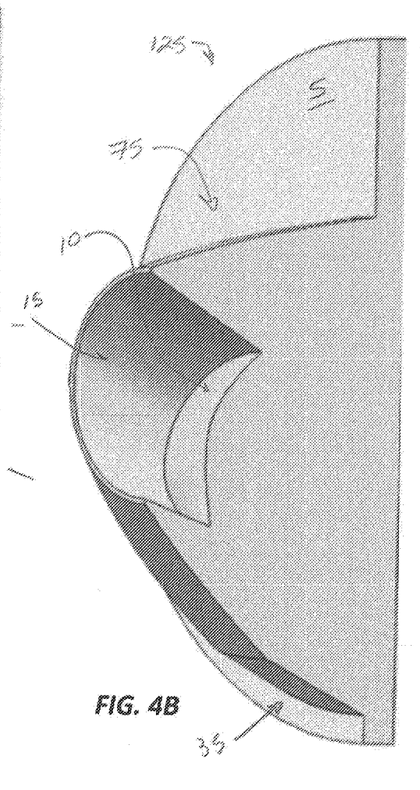
Figure 5:
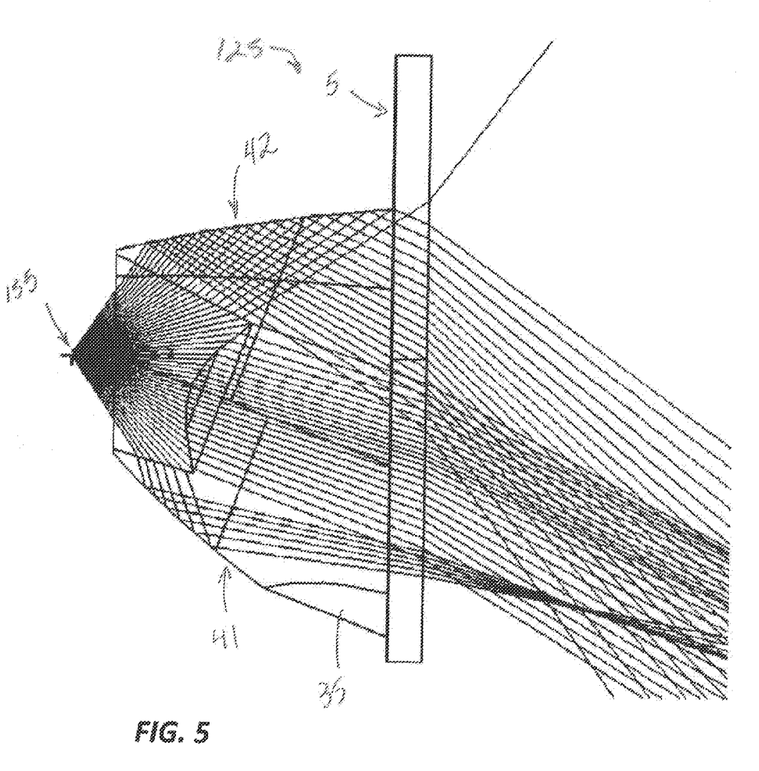
FIG. 5 is a side illustration of the example optic illustrated in FIG. 4 overlaid with example ray traces in accordance with some embodiments of the disclosure.

The optical system 200 that comprises the primary optic 125, the secondary optic, and the light emitting diode 155 will now be discussed in further detail below with additional reference to the remaining figures. FIG. 2 illustrates an example embodiment of the optical system 200. FIGS. 3A, 3B, and 3C illustrate perspective views of an example embodiment of the primary optic 125. FIGS. 3D and 3E illustrate opposing side views of the primary optic 125. FIGS. 3F and 3G respectively illustrate top and bottom views of the primary optic 125. FIG. 4A illustrates a cross sectional view of the primary optic 125. FIG. 4B illustrates a perspective cutaway view of the primary optic 125. FIGS. 4A and 4B utilize the same section to cut the optic 125 for both views. FIG. 5 is a side view of the primary optic 125 overlaid with example ray traces in accordance with some embodiments of the disclosure.

In the illustrated example embodiment, the primary optic 125 comprises a base 5 that comprises a rim that facilitates mounting the optic 125 in the housing 230 of the light module 175 as illustrated in FIG. 1. The base 5 can extend along a primary reference plane 201 or define a primary reference plane 201. In some example embodiments, the base 5 is circular, elliptical, or oval. In some embodiments, for example in the illustrated embodiment, the base 5 is centered on the mechanical axis 26 of the luminaire 100 and on the optical axis 25 of the light emitting diode 155. Thus, the axes 25 and 26 can intersect the base 5 at the center or center point of the base 5. In some embodiments, the base 5 is oriented perpendicular to the axes 25, 26, while in other embodiments, the base 5 can be tilted relative to the axes 25, 26. As also shown in FIG. 2 and as further described below, the secondary optic 50 can be disposed at an angle 23 to the primary optic. Additionally, the secondary optic 50 extends along a secondary reference plane 202.

A projection 75 projects from the base 5 towards the light emitting diode 155. The projection 75 tapers down with extending distance from the base 5. Thus in a cross section taken parallel to the base 5, the projection 75 diminishes in size with decreasing distance to the light emitting diode 155. In some example embodiments (including the illustrated embodiment), the projection 75 can be viewed as conical or cone shaped. As will be further discussed below, the outer/external sides of the projection 75 form totally internally reflective ("TIR") surfaces 41, 42.

In the illustrated embodiment, the projection 75 comprises a cavity 15 that is aligned to the light emitting diode 155. As illustrated, the cavity 15 has a sidewall that is tapered, so that the diameter of the cavity 15 reduces or becomes smaller with increasing depth in the cavity 15. Tapering of the cavity 15 can facilitate injection molding the primary optic 125 using an optical grade polymer, for example polycarbonate or polymethyl methacrylate ("PMMA"). Injection molding can provide a seamless embodiment of the primary optic 125, formed as a unitary element. Other embodiments can be fabricated by combining multiple discrete optical elements.

In the illustrated embodiment, the cavity 15 has an associated axis 30 that is slanted relative to the optical axis 25 of the light emitting diode 155 and the mechanical axis 26 of the luminaire 100. The axis 30 of the cavity 15 can be disposed at a diametrical center of the cavity 15 or define rotational symmetry for the cavity 15, for example.

In some example embodiments and as best seen in FIG. 4A, an angle 19 formed between the cavity axis 30 and the light emitting diode axis 25 or the luminaire mechanical axis 26 can be in a range between 20 and 25 degrees. In some embodiments, that angle 19 can be in a range between 15 and 30 degrees. In some embodiments, that angle 19 can be less than 45 degrees. Other example embodiments may have different values for the angle 19 as may be appropriate for different applications or uses.

As best seen in FIG. 4A, the cavity axis 30 can further be oriented at an angle 21 relative to a reference plane formed by the base 5 or along which the base 5 extends. In some example embodiments, including the illustrated embodiment, the angle 21 may be acute. In some embodiments, the angle 21 is in a range between 85 and 55 degrees. In some embodiments, the angle is in a range between 80 and 60 degrees. In some embodiments, the angle is in a range between 75 and 65 degrees. In some embodiments, the angle is in a range between 70 and 65 degrees. Other example embodiments may have different values for the angle 21 as may be appropriate for different applications or uses. While the base 5 is illustrated as perpendicular to the axes 25, 26, in some embodiments, the base 5 may be canted, resulting in increasing or decreasing the angle 21.

In the illustrated embodiment, the axis 30 of the cavity 15 intersects a convex surface 10 that is disposed at the bottom of the cavity 15 and that refracts incident light. The convex surface 10 may be spherical in form in some example embodiments. In the illustrated embodiment, a tangent 32 can be taken at a place on the convex surface 10 where the axis 30 of the cavity 15 intersects the convex surface 10. As illustrated, the axis 30 of the cavity 15 and the tangent 32 are substantially perpendicular to one another. Thus, an angle of approximately 90 degrees can be formed between the axis 30 and the tangent 32.

While the surface 10 is illustrated as convex, other contours may be utilized for various applications. For example, the surface 10 can be concave or a spline in some embodiments. In some embodiments, the surface 10 can be convex or concave to alter the divergence of incident light to provide control or to limit incidence to the base 5 and/or to achieve a desired beam pattern, for example.

In operation, the light emitting diode 155 emits light into the cavity 15. A portion of that light propagates to the bottom of the cavity 15 and is incident upon the convex surface 10, while another portion is incident upon the sidewall of the cavity 15.

The portion of light that is incident upon the convex surface 10 is refracted and may be focused, condensed, projected, or collimated as illustrated in FIG. 5. Thus, the convex surface 10 can reduce the divergence of the light that is incident upon the convex surface 10. The resulting light can transmit through the base 5 of the primary optic 125 and towards the secondary optic 50 for further processing as will be discussed below.

The portion of light that is incident upon the sidewall of the cavity 15 can transmit through sidewall, into the body of the projection 75, and towards the totally internally reflective surfaces 41, 42 of the primary optic 125. As best seen in FIG. 5, the totally internally reflective surfaces 41, 42 are contoured to condense the incident light via reflection and to direct the reflected light through the base 5 of the primary optic 125 and towards the secondary optic 50 for further processing as will be discussed below. Thus, the totally internally reflective surfaces 41, 42 reduce light divergence via focusing or projecting incident light towards the base 5 of the primary optic 125. The surfaces 41, 42 can further redirect light towards the axis 30 via internally reflection.

The two totally internally reflective surfaces 41, 42 of the projection 75 have different forms as best seen on FIG. 3F. The totally internally reflective surface 41 and the totally internally reflective surface 42 each extends circumferentially partially about the cavity 15, so that they collectively circumscribe or fully extend about the cavity 15. In some example embodiments, rotating a curved line part way about the axis 30 of the cavity 15 can generate the form of the surface 41, while rotating another curved line the remainder of the way about the about the axis 30 can generate the form of the surface 42. In some other embodiments, two lines of differing forms are rotated about two different axes that are laterally offset from one another in order to generate the two surfaces 41, 42. Those two lines, which may be viewed as axes of rotation, can be parallel to one another and laterally offset from one another. In some other embodiments, the two lines can be offset from one another and non-parallel.

As compared to the totally internally reflective surface 42, the totally internally reflect surface 41 is closer to the axis 30 of the cavity 15. In other words, the radial separation between the surface 41 and the cavity 15 is less than the radial separation between the surface 42 and the cavity 15. The totally internally reflective surfaces 41, 42 meet at two circumferentially locations with a discontinuity 40 or abrupt change in form. As best seen in FIG. 5, the different contours of the two surfaces 41, 42 produce different patterns of light. The two light patterns can blend together advantageously when cast on a surface in a grazing orientation, for example in a wall-wash configuration.

In addition to the contours associated with the totally internally reflective surfaces 41, 42, the projection 75 comprises a cutout region 35 adjacent the base 5. As can be best seen in FIGS. 1D and 4B, the cutout region 35 increases the rim width of the base 5 to provide an adequate lip that facilitates mounting in the housing 230.

As best seen in FIGS. 1D and 2, in the illustrated example, the secondary optic 50 is canted relative to the base 5 of the primary optic 125. An angle 23 formed between the respective planar surfaces of the base 5 of the primary optic 125 and secondary optic 50 can be an acute angle. In some example embodiments, the angle 23 can be less than approximately 45 degrees. In some example embodiments, the angle 23 can be in a range of 5 to 20 degrees. In some example embodiments, the angle 23 can be approximately 10 degrees.

As best seen in FIGS. 1D and 4A, the secondary optic 50 can be mounted in a tilted position so that the angle 22 formed between the secondary optic 50 and the axis 30 of the cavity 15 is greater than the angle 21 formed between the base 5 of the primary optic and the axis 30 of the cavity 15. The optical system 200 can be configured so that the angle 22 can be the additive sum of the angle 21 and the angle 23 in some example embodiments, including as illustrated.

In some embodiments, the base 5 of the primary optic 125 is disposed parallel to the secondary optic 50, so that the angle 23 is zero. Mounting the secondary optic 50 perpendicular to the axis 25 while maintaining the primary optic 125 in the illustrated position can achieve this result. Alternatively, the parallelism can result from maintaining the secondary optic 50 in the illustrated position and angling the output face of the primary optic 125.

In some applications, the primary optic 125 may be utilized to control light from the light emitting diode 155 by itself, without using a secondary optic 50. This configuration may be suited for accent lighting applications, for example. When the secondary optic 50 is used (as illustrated), the secondary optic 50 can direct light further off-axis, to provide more aggressive beam steering, for example. The primary optic 125 and secondary optic 50 can be used together in wall washing or grazing applications, for example.

In the illustrated embodiment, the secondary optic 50 comprises a pattern of refractive features that steer light. In some example embodiments, the secondary optic 50 can benefit lateral or left-to-right uniformity of the illumination pattern created by the luminaire 100. As illustrated, the features are on the side of the secondary optic 50 that faces away from the light emitting diode 155. In other words, the features are on the light-emitting side of the secondary optic 50 rather than on the light-receiving side. In other embodiments, the features may be on the light-receiving side or on both sides. In an example embodiment, the features comprise Fresnel prism formed as parallel grooves in the secondary optic 50. As light exits the prism surfaces, refraction occurs to further bend light in a desired direction.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A lighting system comprising:
one or more light emitting diodes;
a secondary optic that extends along a secondary reference plane; and
a primary optic disposed between the secondary optic and the light emitting diode, the primary optic comprising:
a base region that is adjacent to the secondary optic, that extends along a primary reference plane, and that comprises a rim;
a projection that projects from the base region away from the secondary optic and towards the light emitting diode, the projection comprising:
a cavity that extends into the projection, along an axis, and towards the base region, the cavity comprising:
an aperture that is sized to receive light from one or more light emitting diodes;
a bottom; and
a sidewall that extends circumferentially about the axis and that tapers down between the aperture and the bottom;
a convex surface that is disposed at the bottom of the cavity and that is oriented to condense a portion of the received light that is incident upon the convex surface; and
a total internally reflective surface that extends circumferentially with respect to the cavity, that is tapered, and that is oriented to totally internally reflect another portion of the received light that passes through the sidewall, so that the another portion of the received light is reflected towards the base region,
wherein the axis is slanted so as to form an acute angle with the primary reference plane.

2. The lighting system of claim 1, wherein the acute angle is in a range between 85 and 55 degrees.

3. The lighting system of claim 1, wherein the acute angle is in a range between 80 and 60 degrees.

4. The lighting system of claim 1, wherein the acute angle is in a range between 75 and 65 degrees.

5. The lighting system of claim 1, wherein the acute angle is in a range between 70 and 65 degrees.

6. The lighting system of claim 1, wherein the axis is substantially perpendicular to a tangent of the convex surface taken where the axis intersects the convex surface.

7. The lighting system of claim 1, wherein the primary optic consists of a unitary piece of optical material.

8. The lighting system of claim 1, wherein the primary optic is configured to emit through the base region a pattern of illumination that is skewed relative to the primary reference plane.

9. The lighting system of claim 1, wherein the totally internally reflective surface comprises a first surface region and a second surface region that collectively circumscribe the cavity, with the first surface region extending circumferentially partially about the cavity and the second surface region extending circumferentially partially about the cavity,
wherein the first surface region and the second surface region meet one another at two circumferential positions with two discontinuities.

10. The optical lighting system of claim 1, wherein the totally internally reflective surface comprises two abrupt changes in form at two circumferential locations.

11. The optical lighting system of claim 1, wherein the rim circumscribes the projection, including on a first side of the projection and a second side of the projection that is opposite the first side of the projection, and
wherein the rim is substantially wider on the first side of the projection than on the second side of the projection.

12. A system comprising:
a light emitting diode;
a secondary optic that extends along a secondary reference plane and that comprises a pattern of grooves operative to refract light; and
a primary optic that is disposed between the light emitting diode and the secondary optic and that comprises:
a first side that is oriented towards the secondary optic and that extends along a primary reference plane; and
a second side that is oriented away from the secondary optic and towards the light emitting diode and that comprises a projection that projects towards the light emitting diode, the projection comprising:
a cavity that is positioned to receive light emitted by the light emitting diode and that extends along an axis;
a convex surface disposed at a bottom of the cavity; and
a totally internally reflective surface that circumscribes the cavity,
wherein the axis forms an acute angle with the primary reference plane.

13. The system of claim 12, wherein the axis forms a second acute angle with the secondary reference plane, the second acute angle larger than the acute angle.

14. The system of claim 12, wherein the light emitting diode comprises a second axis along which the light emitting diode emits light,
 wherein the convex surface and the totally internally reflective surface are configured to direct the emitted light off the second axis in a direction, and
 wherein the pattern of grooves are configured to direct the emitted light further off the second axis in the direction.

15. The system of claim 12, wherein the light emitting diode comprises a second axis along which the light emitting diode emits light,
 wherein the secondary optic is canted relative to the second axis,
 wherein a gap separates the secondary optic from the primary optic, and
 wherein the system comprises a luminaire.

16. The system of claim 12, wherein the light emitting diode comprises a second axis along which the light emitting diode emits light,
 wherein the second axis extends from the light emitting diode to the convex surface in open air,
 wherein the axis forms a second acute angle with the second axis,
 wherein the axis diverges from the second axis towards a direction,
 wherein the pattern of grooves comprises an array of prisms,
 wherein each prism in the array of prisms comprises a respective surface that is oriented to refract light, and
 wherein each respective surface is oriented to refract the emitted light in the direction.

17. The system of claim 12, further comprising a housing in which the light emitting diode, the first optic, and the second optic are mounted,
 wherein the housing, the light emitting diode, the secondary optic and the primary optic comprise a luminaire,
 wherein the luminaire is configured for recessed mounting in a ceiling and wall wash illumination, and
 wherein the pattern of grooves on a light-receiving side of the secondary optic and is operative to smooth light distribution.

18. The system of claim 12, wherein the secondary optic comprises:
 a third side that faces towards the primary optic and the light emitting diode; and
 a fourth side that faces away from the primary optic and the light emitting diode, wherein the fourth side comprises the pattern of grooves.

19. A system comprising:
 at least one light emitting diode;
 a secondary optic that extends along a secondary reference plane; and
 a primary optic disposed between the at least one light emitting diode and the secondary optic, the primary optic comprising:
  a base forming a first side that extends along a primary reference plane such that there is a gap between the first side of the primary optic and the secondary optic, the primary reference plane and the secondary reference plane forming a first acute angle; and
  a second side that is opposite the first side and that comprises a projection that projects away from the first side and towards the at least one light emitting diode, the projection comprising:
   a cavity that is configured to receive light emitted by the at least one light emitting diode and that extends along an axis;
   a convex refractive surface disposed at a bottom of the cavity; and
   a totally internally reflective surface that circumscribes the cavity,
   wherein the axis forms a second acute angle with the primary reference plane.

20. The system of claim 19, further comprising:
 a luminaire housing in which the light emitting diode, the secondary optic, and the primary optic are disposed; and
 a trim that is magnetically coupled to the luminaire housing.

* * * * *

UNITED STATES PATENT AND TRADEMARK OFFICE
CERTIFICATE OF CORRECTION

PATENT NO. : 10,190,736 B1
APPLICATION NO. : 15/136756
DATED : January 29, 2019
INVENTOR(S) : Steven Walter Pyshos, Ren Chao and Smita Sudheer Anaokar

Page 1 of 1

It is certified that error appears in the above-identified patent and that said Letters Patent is hereby corrected as shown below:

In the Claims

Claim 1: Column 7, Line 41, at the beginning of the line, please delete the words "one or more" and insert therefor the word --a--;
    Column 7, Line 41, after the word "emitting," please delete the word "diodes" and insert therefor the word --diode--;
    Column 7, Lines 55 and 56, after the word "from," please delete the phrase "one or more" and insert therefor the word --the--; and
    Column 7, Line 56, after the word "emitting," please delete the word "diodes" and insert therefor the word --diode--.

Signed and Sealed this
Second Day of April, 2019

Andrei Iancu
*Director of the United States Patent and Trademark Office*